(12) United States Patent
Nevarez et al.

(10) Patent No.: US 10,423,630 B2
(45) Date of Patent: Sep. 24, 2019

(54) PRESENTING A PROFILE CARD RELEVANT TO A MEMBER OF A SOCIAL NETWORK

(71) Applicant: Microsoft Technology Licensing, LLC, Redmond, WA (US)

(72) Inventors: Alberto Fabian Nevarez, San Carlos, CA (US); Thomas Michael Lee, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 378 days.

(21) Appl. No.: 15/278,535

(22) Filed: Sep. 28, 2016

(65) Prior Publication Data

US 2018/0089195 A1 Mar. 29, 2018

(51) Int. Cl.
*G06F 16/20* (2019.01)
*G06F 16/2457* (2019.01)
*G06F 17/21* (2006.01)
*G06F 16/248* (2019.01)
*G06Q 50/00* (2012.01)
*G06Q 30/02* (2012.01)

(52) U.S. Cl.
CPC ...... *G06F 16/24578* (2019.01); *G06F 16/248* (2019.01); *G06F 17/212* (2013.01); *G06Q 30/02* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,671,120 B1* | 3/2014 | Bicknell | ............... | G06Q 10/08 707/804 |
| 9,223,879 B2* | 12/2015 | Narayanan | .......... | G06F 16/9535 |
| 2012/0166433 A1* | 6/2012 | Tseng | ..................... | H04W 4/21 707/728 |
| 2015/0213082 A1* | 7/2015 | Frankel | ................. | G06F 16/285 707/758 |

* cited by examiner

*Primary Examiner* — Jau Shya Meng
(74) *Attorney, Agent, or Firm* — Schwegman Lundberg & Woessner, P.A.

(57) ABSTRACT

Techniques for presenting a profile card personalized to a member of a social network are described. A first viewer profile can be selected, using member data, from a list of profiles of viewers having viewed a first member profile of a first member, the member data having profile attributes associated with each profile. Additionally, a profile card can be generated for the selected first viewer profile based on the profile attributes associated with the first viewer profile. Moreover, a relevance score for a first highlight associated with the selected first viewer profile can be calculated based on the member data of the first member profile. Furthermore, the profile card can be updated to include the first highlight when the calculated relevance score for the first highlight is higher than a predetermined threshold value. Subsequently, a user interface can cause a presentation of the profile card on a display of a device of the first member.

20 Claims, 6 Drawing Sheets

PRESENTING A PROFILE CARD RELEVANT TO A MEMBER OF A SOCIAL NETWORK

TECHNICAL FIELD

The subject matter disclosed herein relates generally to the technical field of data processing and specifically to storing and processing profile attributes for generating a profile card that is personalized for a member of an online social network.

BACKGROUND

Social networks provide a platform for a user to interact, make connections, and collaborate with an online community of people with similar interests, needs, and goals. A social network can include a member profile, such as a profile page, for each member of the social network. The member profile of a member can be modified by the member. For example, a member profile may include contact information, educational information, employment information, connections to other members, skills, and interests. Additionally, the social network can allow viewers to view a member profile. Furthermore, depending on the privacy setting of a viewer, the viewer can allow a member to know that the viewer has viewed the member's profile. In some instances, information relevant about the viewer may be missing for the member.

BRIEF DESCRIPTION OF THE DRAWINGS

Some embodiments are illustrated by way of example and not limitation in the figures of the accompanying drawings.

DETAILED DESCRIPTION

Figure 1:
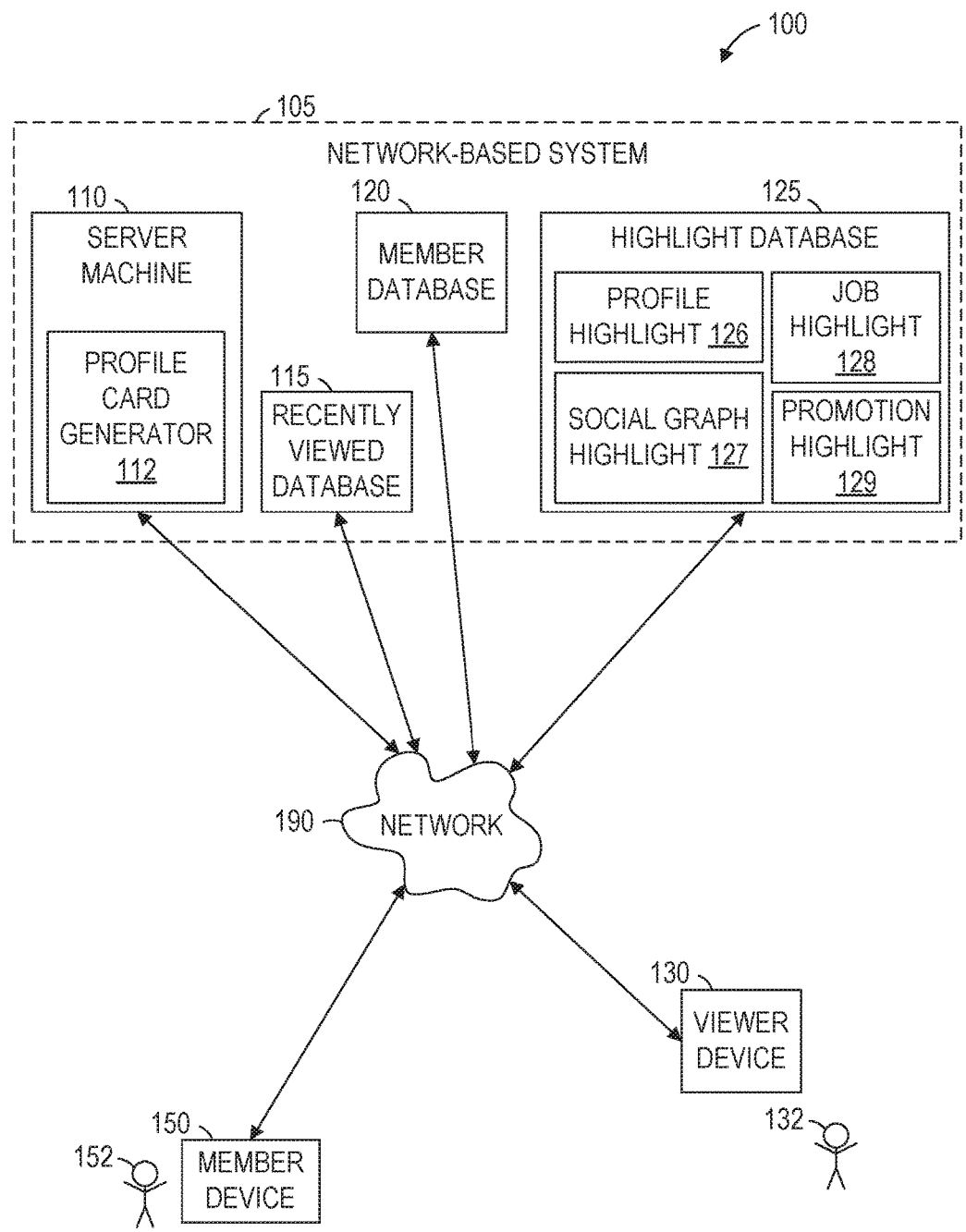
FIG. 1 is a network diagram illustrating a network environment suitable for a social network system, according to various embodiments.

The description that follows includes systems, methods, techniques, instruction sequences, and computing machine program products that embody illustrative embodiments. In the following description, for the purposes of explanation, numerous specific details are set forth in order to provide an understanding of various embodiments of the subject matter discussed herein. It will be evident, however, to those skilled in the art, that embodiments of the inventive subject matter may be practiced without these specific details. In general, well-known instruction instances, protocols, structures, and techniques are not necessarily shown in detail.

A social network allows viewers to view profile pages of members in the social network. Additionally, depending on the privacy setting of a viewer, the viewer can allow a member to know whether the viewer has viewed the member's profile. In some instances, when the viewer selects a public mode for browsing profile pages of the member, the member can have knowledge that the viewer has recently viewed the member's profile page. For example, the member can browse the "who viewed my profile" (WVMP) feature on the social network system to determine which viewers have recently viewed the member's profile page. In the WVMP feature, the information about the viewer can be presented in a profile card, as later illustrated in FIG. 5.

The profile card includes a subset (e.g., fewer than five) of the profile attributes listed on the profile page of the viewer. For example, the profile card can be generated using five profile attributes from at least ten or twenty profile attributes available in the viewer's profile page. In some instances, the profile card simply includes a profile picture, a name, a job title, and an industry. The profile card can be similar to an online business card, while the profile page can resemble an online resume. Additionally, the profile card can include information associated with the last time that the viewer viewed the profile page of the member.

Moreover, the social network system can enhance the profile card to include a highlight associated with the viewer that is relevant to the member. Example highlights include a job posting, a publication by the viewer, information about a product, information about an employer of the viewer, and so on. Subsequently, the social network system can present the enhanced profile card of the viewer, which includes the highlight, to the member. The enhanced profile card can be present in the WVMP feature along with other generic (non-enhanced) profile cards of other viewers. In some instances, the member can select the highlight, and an action module can perform an action associated with the selected highlight.

Example methods and systems are directed to techniques for selecting a profile card of a viewer, and enhancing (e.g., personalizing) the profile card using information relevant between the viewer and the member. More specifically, the present disclosure relates to methods, systems, and computer program products for determining a viewer's highlight that is specific to the member using a relevance score calculated by comparing data associated with the viewer and the member.

FIG. 1 is a network diagram illustrating a network environment 100 suitable for a social network service, according to some example embodiments. The network environment 100 includes a server machine 110, a recently viewed database 115, a member database 120, a viewer device 130 for a viewer 132, and a member device 150 for a member 152, all communicatively coupled to each other via a network 190. The server machine 110 includes a profile card generator 112. The server machine 110, the recently viewed database 115, and the member database 120 may form all or part of a network-based system 105 (e.g., a cloud-based server system configured to provide one or more services to the viewer device 130 and the member device 150). The network-based system 105 is an example of a social network system, such as the social network system 210 in FIG. 2. The recently viewed database 115 includes a list of viewer profiles (e.g., profiles of viewers) who have recently (e.g., within the last 30 days) viewed a first member profile, a second member profile, and so on, as further described in FIG. 2. The member database 120 stores member data (e.g., profile attributes, social graph data, activity data) for the members of the social network system, as further described in FIG. 2. The server machine 110, the viewer device 130, and the member device 150 may each be implemented in a computer system, in whole or in part, as described below with respect to FIG. 6.

In some instances, a member can browse the WVMP feature on the network-based system 105 to determine the viewers that have recently viewed the member's profile page. The WVMP feature can present profile cards of the viewers that have recently viewed the member's profile page. The profile card generator 112 generates a profile card of a viewer when a member selects the WVMP feature.

Additionally, the profile card can be enhanced to present a highlight accessed from a highlight database 125. Examples of highlights include a profile highlight 126 (e.g., education information or company information of the viewer), a social graph highlight 127 (e.g., viewer's connections that are relevant to the member), a job highlight 128 (e.g., a job posting associated with the viewer), and a promotion highlight 129 (e.g., new product associated with the viewer, other marketing information).

In some instances, the highlight stored in the highlight database 125 is received from the viewer as a user input. For example, the viewer may want to promote a specific highlight (e.g., publication, product, brand information, job posting) to the member. In the job posting example, the viewer may be a recruiter trying to recruit the member using the job posting. In the promotion example, the viewer may be a sales or account manager trying to help the member become aware of a new product or service offering. The highlight may be promoted by the viewer by paying a fee.

Furthermore, a highlight from a plurality of highlights can be determined by the social network system using a relevance score. In some instances, a relevance score can be calculated by comparing the member data of the viewer and the member data of the member that is stored in the member database 120. For example, the network-based system 105 can use the relevance score to determine whether a highlight is relevant to the member. The highlights can be ranked using the relevance score, and the highlight with the highest score can be included in the enhanced profile card. In one example, the relevance score is calculated by summing the attributes associated with the highlight that are common with profile attributes of the member. For example, the relevance score increases when more attributes associated with the highlight are in common with profile attributes of the member. The profile card generator 112 can generate an enhanced profile card that includes the highlight with the highest relevance score. In some instances, the profile card generator 112 can emphasize or highlight the attribute to capture the member's attention.

The determined highlight is included in a profile card to create an enhanced profile card. The profile card includes a limited number of profile attributes of the viewer such as a profile picture, contact information, and a job title. The highlight can be derived from other profile attributes, such as educational information, career information, skills, and interest of the viewer. Additionally, the highlight can be based a social graph attribute (e.g., common connections), or a product attribute (e.g., new product), or a job attribute (e.g., job posting). In order to capture the members attention, a highlight associated with a viewer that is above a predetermined threshold is presented on the profile card. The predetermined threshold can be set by an administrator or determined by the profile card generator 112. With a highlight that is specific to the member, the profile card is personalized specifically to the member.

In some instances, the highlight is a profile highlight 126, a social graph highlight 127, a job highlight 128, a promotion highlight 129, and so on. The profile highlight 126 is a profile attribute that is in common between the member of the profile page and the viewer of the profile page. By way of example, a profile highlight 126 can be that both the member and the viewer worked at the same company for three years. Additionally, a profile highlight 126 can be another profile attribute of the viewer that is relevant or beneficial to the member, such as common educational background, common skills, common endorsements, common interests, and so on.

The social graph highlight 127 can include the viewer's connections that are relevant to the member. In some instances, the social graph highlight 127 can be the number of first-degree connections that the member has at Company A. For example, the network-based system 105 can present an enhanced profile card with the social graph highlight 127 that includes the number of programmers at Company A that are connected to the viewer. The social graph highlight 127 can include any information that reflects the social graph data that is relevant or beneficial to the member. Additionally, the social graph highlight 127 can include how the viewer arrived to the member's profile, such as the viewer found the member's profile via the home page or via a search.

The job highlight 128 is a highlight associated with a job posting or an employer. In some instances, the job highlight 128 is the job posting listed on the network-based system 105. For example, the viewer can be a recruiter. When the viewer is a recruiter, the social network system can determine a job posting that is relevant to the member by comparing the attributes (e.g., job description) of the job posting and the profile attributes of the member. The job posting can be relevant to the member by comparing the job description having specific requirements that match or are similar to the member's education information, employment information, skills, certifications, or endorsements. The job highlight 128 can include other employer information associated with the employer of the viewer.

The promotion highlight 129 is a highlight associated with an item (e.g., product, publication, service) that a viewer wants to promote. The viewer may be a marketer that is interested in attracting the member's attention towards the promotion highlight 129. For example, the promotion highlight 129 can be a new product being marketed by the viewer. Additionally, the promotion highlight 129 can include postings published by the viewer, articles associated with the viewer, and other viewer behavior and activity data that can be relevant or beneficial to the member.

Moreover, once the highlight is selected by the member, an action module (e.g., the action module 208 in FIG. 2, further discussed below) can present an action to the member. The action can include presenting: a company page of the viewer; a job posting; a product; a publication; an article; a connection request; an email; or a message. For example, an email or a message can be pre-generated by the action module so that the member can easily send the pre-generated message to the viewer.

Furthermore, the member can confirm (e.g., approve) performing the presented action. The action module can perform the presented action in response to the member's confirmation. For example, the action module can generate a message to the viewer about the specific job opportunity on behalf of the member.

Techniques described herein can generate and present a highlight relevant to a member, present an action recommendation, and perform the action on behalf of the member. Using the specialized database architecture of the recently viewed data and the member data, the profile card selection of a viewer and the highlight determination are performed in real-time. Additionally, the enhanced profile card increases member engagement in the social network system, and increases promotion revenues for the social network system.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Also shown in FIG. 1 are the viewer 132 and member 152. One or both of the viewer 132 and member 152 are members of the social network. In some instances, viewer 132 or member 152 may be a human, a machine user (e.g., a computer configured by a software program to interact with the device 130 or 150), or any suitable combination thereof (e.g., a human assisted by a machine or a machine supervised by a human). The viewer 132 is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the viewer 132. Likewise, the member 152 is associated with the device 150. As an example, the device 150 may be a desktop computer, a vehicle computer, a tablet computer, a navigational device, a portable media device, a smartphone, or a wearable device (e.g., a smart watch or smart glasses) belonging to the member 152.

Any of the machines, recently viewed database 115, member database 120, highlight database 125, member device 150, or viewer device 130 shown in FIG. 1 may be implemented in a computer modified (e.g., configured or programmed) by software (e.g., one or more software modules) to be a special-purpose computer to perform one or more of the functions described herein for that machine. For example, a computer system able to implement any one or more of the methodologies described herein is discussed below with respect to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, recently viewed database 115, member database 120, highlight database 125, member device 150, or viewer device 130 illustrated in FIG. 1 may be combined into a single machine, database, or device, and the functions described herein for any single machine, database, or device may be subdivided among multiple machines, databases, or devices.

The network 190 may be any network that enables communication between or among machines, databases, and devices (e.g., the server machine 110 and the viewer device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
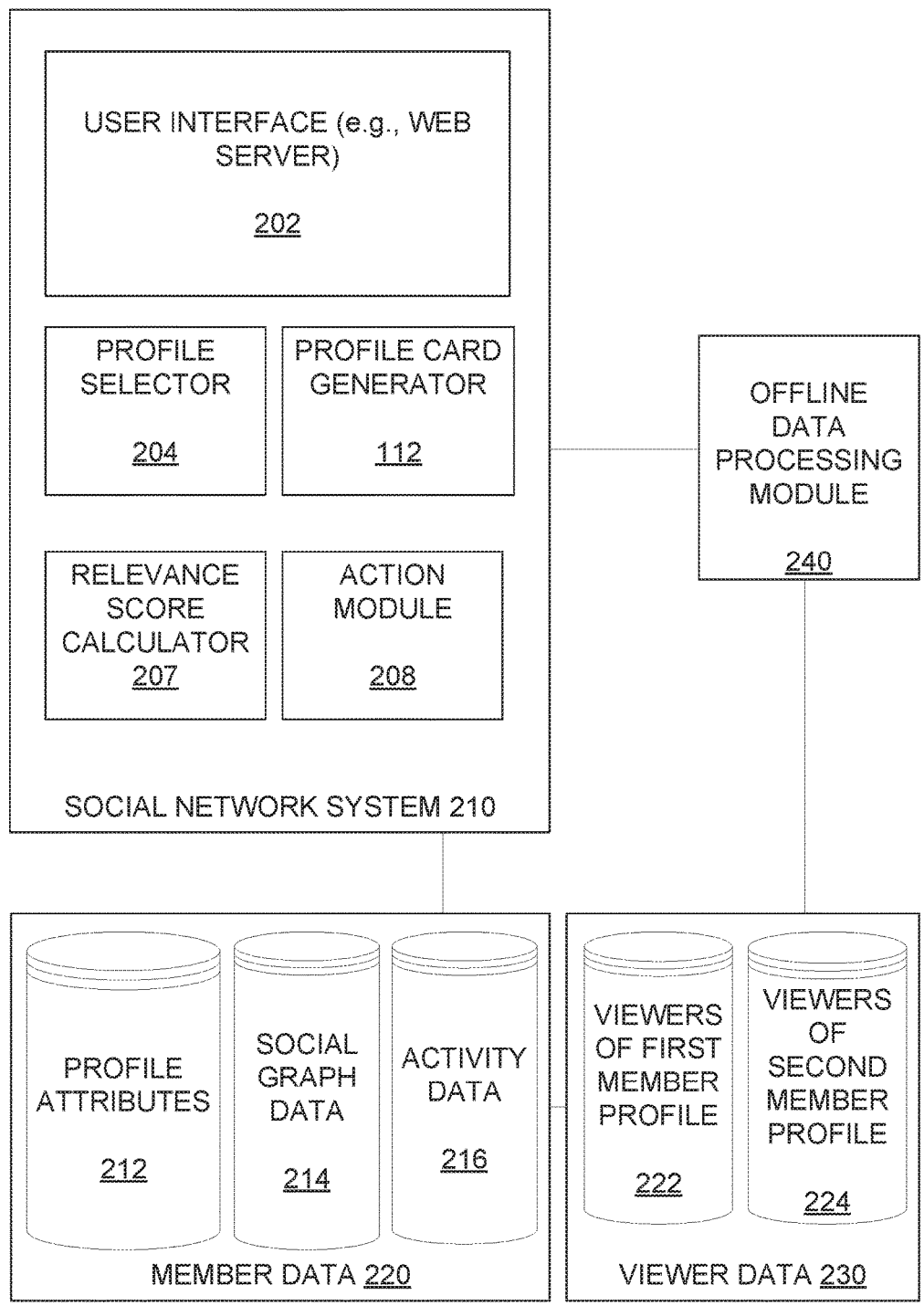
FIG. 2 is a block diagram illustrating various modules of the social network system, according to various embodiments.

FIG. 2 is a block diagram illustrating components of a social network system 210, according to some example embodiments. The social network system 210 is an example of a network-based system 105 of FIG. 1. The social network system 210 can include a user interface 202, a profile selector 204, a profile card generator 112, a relevance score calculator 207, and an action module 208, all configured to communicate with each other (e.g., via a bus, shared memory, or a switch).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Additionally, the social network system 210 can communicate with the recently viewed database 115 of FIG. 1, such as a database storing recent viewer data 230. The recent viewer data 230 includes data (e.g., list of viewer profiles) of viewers that have recently viewed a first member profile 222, data of viewers that have recently viewed a second member profile 224, and so on. For example, using the data of viewers of a first member profile 222, the profile selector 204 can select the profiles of viewers to present to the first member. Subsequently, the profile card generator 112 generates profile cards that is derived from the profile of the viewers selected by the profile selector 204. As previously mentioned, the profile cards can be presented when the member selects the WVMP feature in the social network system 210. In some instances, the profile card is presented on the newsfeed or the home page of the online social network system 210. The profile cards can be presented on any page (e.g., webpage) of the social network system 210.

Moreover, the social network system 210 can communicate with the member database 120 of FIG. 1, such as a database storing member data 220 of the viewer device 130, the member 150, and all other members in the social network system 210. The member data 220 can include profile attributes 212, social graph data 214, and activity data 216. For example, by comparing the member data 220 of the viewer 132 with attributes associated with each highlight, the relevance score calculator 207 calculates a relevance score for each highlight in relations to the viewer 132.

As previously mentioned, the highlight can be a profile highlight 126 (e.g., skills, interest), a social graph highlight 127 (e.g., common connections), a promotion highlight 129 (e.g., new product), or a job highlight 128 (e.g., job posting). The profile highlight 126, social graph highlight 127, job highlight 128, or a promotion highlight 129 can be stored in the highlight database 125. The profile selector 204, profile card generator 112, the relevance score calculator 207, and the action module 208 can communicate with the highlight database 125 in FIG. 1.

In some instances, the profile selector 204 and the relevance score calculator 207 can be configured to process data offline or periodically using an offline data processing module 240. For example, the offline data processing module 240 can include one or more large-scale processing server, such as an Apache™ Hadoop® servers that access the member data 220 and the recent viewer data 230 periodically (e.g., on a nightly basis) in order to rank the viewer profiles and calculate a relevance score associated with the highlight. Processing the member data 220, such as selecting profiles to present in the WVMP feature, and selecting highlights for an enhanced profile card, may be computationally intensive. Therefore, some of the calculating and selecting can be done offline, such as one or more parameters associated with the relevance score. By having the one or more parameters calculated offline, less real-time processing time may be needed by the relevance score calculator 207 in order to calculate the relevance score for each highlight. As a result, these parameters can be inputted in the profile card generator 112 and relevance score calculator 207 in real-time in order to almost instantaneously present the enhanced profile cards of the viewers to the member.

The action module 208 can present suggested actions in the enhanced profile card, and perform the suggested action in response to a confirmation from the member. For example, when the enhanced profile card is associated with a recruiter, the action suggested can be associated with a job posting. The action can be a hyperlink to the job posting that is included the profile card, and selection of the hyperlink instructs the action module 208 to retrieve a webpage corresponding to the job posting. Additionally, in response to the confirmation from the member to apply to the job posting, the action module 208 can automatically fill in the information into the job questionnaire, and apply to the job posting on behalf of the member.

As shown in FIG. 2, one or more database includes member data 220. In some instances, the member data 220 is stored in the member database 120 in FIG. 1. The member data 220 includes the profile attributes 212, such as member profile data, viewer profile data, and profile data for various entities (e.g., employer, company, organization). For instance, with many social network services, when a member device 150 or viewer device 130 registers to become a member of the social network system 210, the member is prompted to provide a variety of personal and employment information to be displayed in the member's personal web page. As used herein, personal and/or employing information is referred to as profile attributes 212. Examples of such profile attributes 212 include, but are not limited to, member's age, birthdate, gender, interests, contact information, residential address, home town and/or state, spouse and/or family members, educational background (e.g., schools, majors, matriculation and/or graduation dates, etc.), employment history, office location, skills, professional organizations, and other such personal and/or employment information. Additionally, profile attributes 212 include the various skills that each member has indicated he or she possesses, and skills for which a member has been endorsed.

With certain social network services, such as some business or professional network services, the profile attributes 212 may include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on.

Another example of the profile attributes 212 can include data associated with a company page. For example, when a representative of an entity (e.g., company) initially registers the entity with the social network service, the representative may be prompted to provide certain information about the entity. This information may be displayed on a company profile page.

Additionally, the member data 220 can store the social graph data 214 and the activity data 216. In some instances, social network services provide their users with a mechanism for defining their relationships with other people. This digital representation of real-world relationships is frequently referred to as a social graph.

For example, the social graph data 214 corresponds to a member's presence within the social network service. Consistent with some embodiments, a social graph is implemented with a specialized graph data structure in which various members are represented as nodes connected by edges.

In addition to hosting a vast amount of social graph data 214, member data 220 includes activity data 216. Examples of activity data 216 include, but are not limited to, an access log, profile page views, entity page views, newsfeed postings, birthday information, and clicking on links on the social network system 210. Additionally, the activity data 216 can include information associated with applications and services that allow members the opportunity to share and receive information, often customized to the interests of the member. In some embodiments, members may be able to self-organize into groups, or interest groups, organized around subject matter or a topic of interest.

Figure 3:
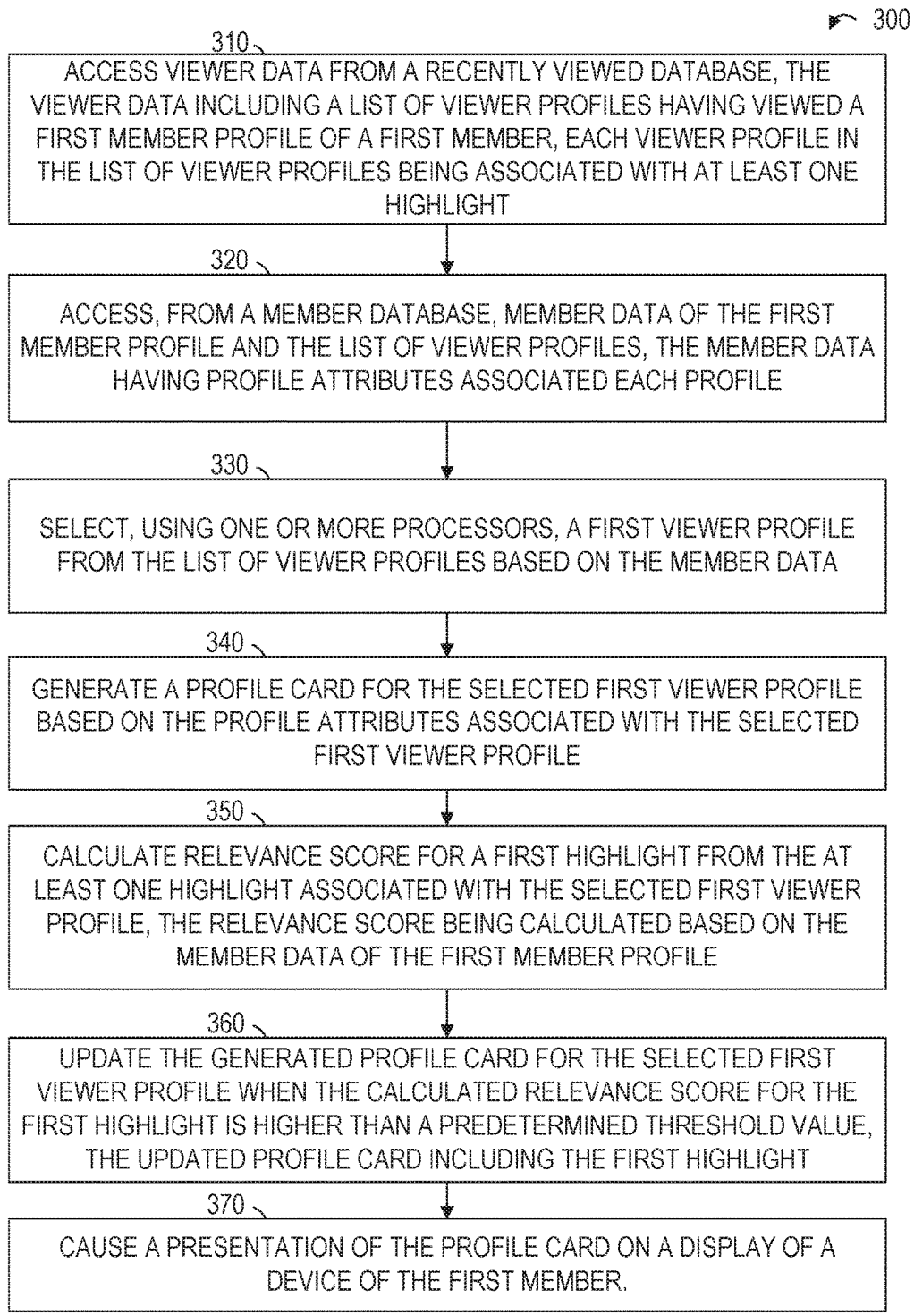
FIG. 3 is a flowchart illustrating a method of generating an enhanced profile card using a relevance score, according to various embodiments.
Figure 4:
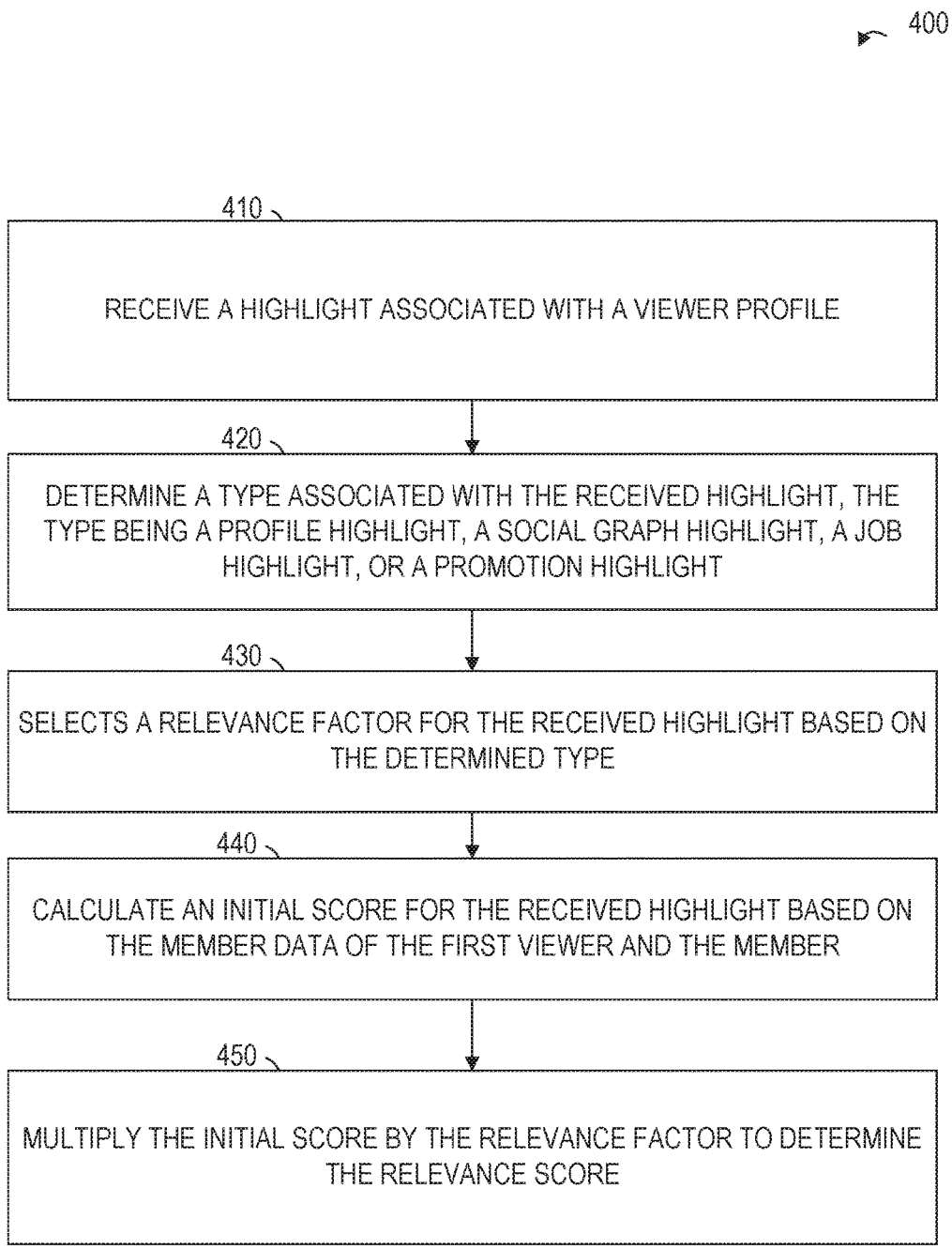
FIG. 4 is a flowchart illustrating a method of calculating the relevance score for a highlight, according to various embodiments.
Figure 5:
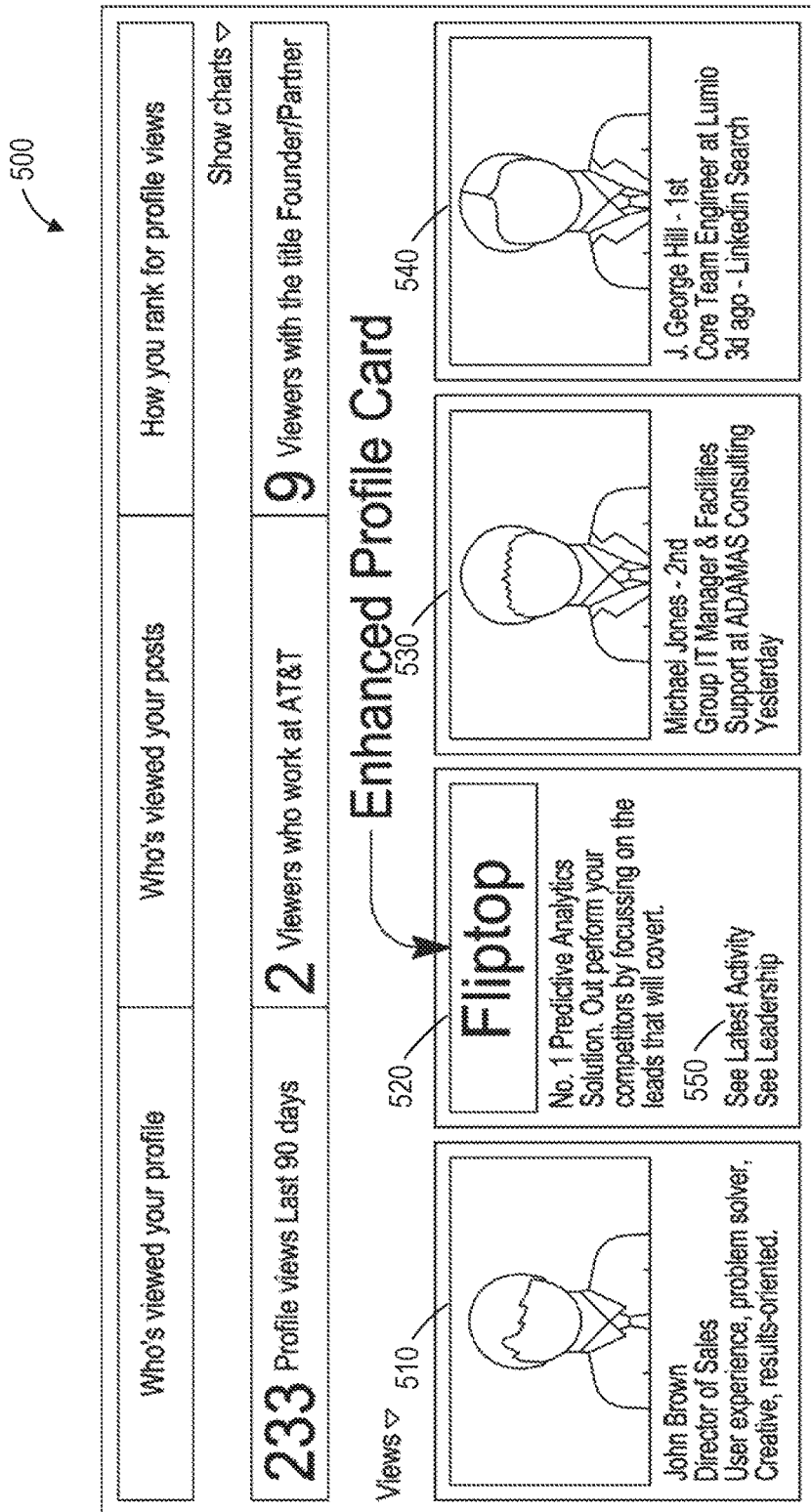
FIG. 5 is an example of an enhanced profile card with a highlight and a generic profile card without a highlight, according to various embodiments.

As will be further described with respect to FIGS. 3-5, the profile card generator 112, in conjunction with the user interface 202, profile selector 204, relevance score calculator 207, and action module 208, can present a personalized profile card using a relevance score that is specific to a member.

FIG. 3 is a flowchart illustrating a method 300 for generating an enhanced profile card using a relevance score, according to various embodiments. Operations in the method 300 may be performed by the network-based system 105 using modules described above with respect to FIG. 2.

At operation 310, the profile selector 204 accesses viewer data 230. The viewer data 230 can include a list of viewer profiles that have recently viewed a member's profile page, such as the viewers of first member profile 222 and the viewers of second member profile 224. The viewer data 230 can be stored in the recently viewed database 115 in FIG. 1. The profile selector 204 can access the recently viewed database 115 via network 190 of FIG. 1.

In some instances, each viewer profile in the list of viewer profiles is associated with at least one highlight (e.g., profile highlight 126, social graph highlight 127, job highlight 128, promotion highlight 129). Additionally, the highlight can include a hyperlink associated with the highlight. The hyperlink can direct the first member to another page in the social network system 210, or to a webpage on a third-party website. For example, the job highlight 128 can have a hyperlink to a job posting associated with the job highlight 128. In another example, the promotion highlight 129 can include a hyperlink to a product being promoted by the promotion highlight 129.

The viewer data 230 includes a list of viewer profiles having viewed a first member profile of a first member, which is also referred to the viewers of the first member profile 222. For example, the first member can be member 152, and the viewer 132 can have a viewer profile in the list of viewer profiles. Additionally, each viewer profile in the list of viewer profiles is associated with at least one highlight.

In some instances, the first viewer profile is selected from the list of viewer profiles based on a number of first-degree connections being similar (e.g., same) between the first viewer profile and the first member profile.

As previously mentioned, the at least one highlight associated with each profile can be stored in the highlight database 125 of FIG. 1. The at least one highlight associated with each profile can be a profile highlight 126, a social graph highlight 127, a job highlight 128, or a promotion highlight 129.

At operation 320, the profile selector 204 accesses, from the member data 220 of the first member profile 222 and member data 220 of the list of viewer profiles. The member data 220 can include profile attributes 212 associated with each profile. Additionally, the member data 220 can include social graph data 214 and activity data 216. The profile selector 204 can access the member database 120 via network 190.

At operation 330, the profile selector 204 selects a first viewer profile from the list of viewer profiles based on the member data 220. In some instances, the profile selector 204 selects a predetermined number (e.g., top three) of profiles from the viewers of first member profile 222 using the profile attributes 212. The profile attributes 212 of each viewer in the viewers of first member profile 222 can be compared against the profile attributes 212 of the member to determine a number of common profile attributes. For example, a common profile attributes refers to a profile attribute (e.g., a location, an employer) of two different members having the same value (e.g., San Francisco, Company A). Continuing with the example, the top three profiles with the highest number of common profile attributes can be selected at operation 330. The profile selector 204 can include a processor to perform operation 330. For example, the selection at operation 330 can be performed by processor 610 as later described in FIG. 6.

In one embodiment, the first viewer profile is selected from the list of viewer profiles by comparing a number of profile attributes 212 that are similar between the first viewer profile and the first member profile. For example, the first viewer profile is selected because the first viewer profile has a similar degree, similar industry, similar location, similar job experience, similar job title, similar skills, similar endorsements, or other similar attributes with the first member profile. Attributes are similar when the profile attributes 212 listed on the first viewer profile are the same as the profile attributes 212 listed on the first member profile. Additionally, the social network system 210 maintains an association between various keywords, and keywords that are associated with an attribute are determined to be similar. According to some embodiments, the likelihood of selecting a viewer profile from the list of viewer profiles increases when the number of similar profile attributes 212 increases.

In some instances, the first viewer profile is selected from the list of viewer profiles by summing the number of first-degree connections that are similar between the first viewer profile and the first member profile. As previously mentioned, the member data includes social graph data 214 having first-degree connections for each profile. For example, the first viewer profile is selected because the first viewer has a predetermined number (e.g., more than 50) of first-degree connections that are similar to the first member profile. According to some embodiments, the likelihood of selecting a viewer profile from the list of viewer profiles increases when the number of similar first-degree connections between the first viewer profile and the first member profile increases.

In some instances, the first viewer profile is selected by comparing the activity data 216 of the first viewer profile and the activity data 216 of the first member at operation 330. For example, the first viewer profile can be selected by having common (e.g., shared, similar) activities with the first member profile, such as viewing similar pages on the social network system 210, clicking similar items posted on the social network system 210, and other similar activities that are stored as activity data 216.

Additionally, each viewer profile in the list of viewer profiles can browse under a public viewing mode, semi-private mode, or a private viewing mode. Accordingly, to some embodiments, the first viewer profile is selected from the list of viewer profiles only if the first viewer profile has the public viewing mode. A public viewing mode can represent that the first viewer is allowing other members of the social network system 210 to know that the first viewer has viewed their profile. A private viewing mode can represent that the first viewer is not allowing other viewers to know that the first viewer has viewed their profile. A semi-private mode can represent that the first viewer is allowing other members of the social network system 210 to know only some information (e.g., location, job title, industry) about the first viewer when the other members select the WVMP feature. For example, the first viewer's name may not be included in the semi-private mode.

At operation 340, the profile card generator 112 generates a profile card for the selected first viewer profile based on the profile attributes associated with the selected first viewer profile. FIG. 5 illustrates an example profile card, in accordance with some embodiments. The profile card generated at operation 340 can be performed by processors 610 of FIG. 6.

As previously mentioned, the profile card, being similar to an online business card, is generated with fewer profile attributes than included in the first viewer profile. For example, the generated profile card includes fewer than five profile attributes, while the first viewer profile includes more than ten attributes. In some instances, a member can select an option in the profile card to view other relevant profile attributes (e.g., other 20 common profile attributes) that initially were not included in the profile card (e.g., scored lower than the threshold), but can nonetheless have useful commonalities between the member and the first viewer profile. The number of profile attributes that are included in the profile card can be predetermined by an administrator of the social network system 210, or calculated by the profile card generator 112 using machine learning techniques. The inputs for the machine learning techniques can include data analysis of previously generated enhanced profile cards for one or more member profiles. The data analysis can include a click-rate on the highlight, an ignore rate associated with the user removing the profile card from the user interface, and direct user feedback associated with profile cards with different number of profile attributes. The different machine learning algorithms can include, but are not limited to, a linear regression, logistic regression, decision tree, Naive Bayes, cluster analysis, and association rule learning.

At operation 350, the relevance score calculator 207 calculates a relevance score for a first highlight from the at least one highlight associated with the selected first viewer profile. The relevance score can be calculated based on the member data 220 of the first member profile. Calculating the relevance score is further discussed with reference to FIG. 4.

In some instances, each highlight is linked to specific attributes, and the relevance score is calculated by summing the number of specific attributes being in common with the profile attributes 212 of the first member profile. For example, a job highlight 128 for a job posting can be associated with a location (i.e., San Francisco), industry (i.e., technology), job title (i.e., software developer), minimum years of experience (i.e., at least five years), and a certificate (e.g., Python™ programming language certificate). The relevance score for this job highlight 128 would be five, if the profile attributes 212 first member profile lists San Francisco as a location, a technology company as an employer, software developer as a job title, more than five years of experience, and a certificate in Python programming language. In some instances, the highlight having the most attributes in common with the profile attribute 212 of the first member profile can be selected for the enhanced profile card. The calculation at operation 350 can be performed by the relevance score calculator 207 using processors 610 of FIG. 6.

The first highlight may be selected from one or more of a profile highlight 126, a social graph highlight 127, a job highlight 128, or a promotion highlight 129. In some instances, a viewer profile is associated with a group (e.g., recruiter group, sales group), and the first highlight is selected based on the group associated with the viewer profile. For example, when the first viewer profile is associated with the recruiter group, the first highlight is a job highlight 128 that corresponds to a job posting associated with an employer of the first viewer profile. Alternatively, when the first viewer is associate with the sales group, the first highlight is a promotion highlight 129 that is associated with a product that the first viewers wants to promote. In another example, the first highlight can be a link to a company page of the first viewer profile.

In some instances, the first highlight is linked to a specific profile highlight, and the relevance score for the first highlight is calculated by comparing the number of profile attributes 212 of the first member profile that are related (e.g., similar, matching) to the specific profile highlight. The relevance score can be a summation of the number of profile attributes 212 in the first member profile that are the same as the profile attributes 212 in the first viewer profile associated with the specific profile highlight. For example, the relevance score can equal three if the first member and the first viewer have the same location, job title, and company. Additionally, the relevance score can be directly correlated to a click-rate associated the first member clicking on the first highlight. The click probability of the first member can be accessed from the activity data 216 of the first member. The activity data 216 stores past activity of the first member, such as the click-rate on previously presented highlights. Furthermore, the relevance score for the first highlight is further calculated using a rating associated with the first viewer profile being a paid member. For example, when the first viewer profile is a paid member (e.g., recruiter promoting a job listing), the profile card associated with this first viewer can be automatically enhanced to include a highlight.

At operation 360, the profile card generator 112 updates the generated profile card for the selected first viewer profile when the relevance score for the first highlight calculated at operation 350 is higher than a predetermined threshold value (e.g., 50, 70, 90). The threshold can be predetermined by the profile card generator 112 based on the number of enhanced profile cards, the relevance score of other highlights, and the past click-rate of previous highlights presented to the first member. For example, the threshold can be the average number of enhanced profile cards shown to previous members. Alternatively, the threshold can be a number (e.g., three) that is set by an administrator. The updating at operation 360 can be performed by the profile card generator 112 using processors 610 of FIG. 6.

In some instances, the profile card is updated to include the first highlight. For example, the relevance score can range from 0 to 100, and the predetermined threshold can be 70. In this example, a relevance score above 70 can infer that the first highlight is relevant to the first member, and therefore the profile card is enhanced to include the first highlight. The predetermined threshold can be changed by the profile card generator 112 with an input from an administrator or machine-learning techniques discussed herein.

At operation 370, the user interface 202 causes a presentation of the profile card on a display of a device of the first member. The profile card is generated at operation 340, and can be updated at operation 360 to include the first highlight based on the relevance score calculated at operation 350. The profile card can be presented at operation 370 by the user interface 202 using processors 610 of FIG. 6.

In some instances, the profile card can include a network highlight. The network highlight includes one or more first-degree connections that the first member and the first viewer have in common. The social network system can determine a common member that is a first-degree connection to both the first member and the first viewer. The network highlight can be generated using the common member. For example, the network highlight can include a brief statement in the profile card associated with the first viewer profile such as "[first member] and [first viewer] have [number] connections in common," or "[Common member] can introduce [first member] to the [first viewer] at company [Y]." Common member can me a common connection between the first member and the first viewer, and company Y can be the employer of the first viewer.

In some instances, the highlight is included outside the profile card. For example, the highlight can be presented below the profile card, on the right of the profile card, on the left of the profile card, or above the profile card.

In some instances, the method 300 can further include the user interface 202 receiving an indication that a new viewer profile has viewed the first member profile. Additionally, the list of viewer profiles (e.g., viewers of first member profile 222 in the viewer data 230) is updated to include the new viewer profile.

In some instances, the method 300 can further include the social network system 210 determining that a member associated with a second viewer profile has not viewed the first member profile in a predetermined amount of time (e.g., in the past week, in the past 15 days, in the past month). In response to the determination that the second viewer profile has not viewed the first member profile recently, the list of viewer profiles (e.g., viewers of first member profile 222 in the viewer data 230) is updated by removing the second viewer profile.

In some instances, the method 300 further includes the user interface 202 receiving a user input from a first viewer associated with the first viewer profile. Additionally, the profile card generator 112 can generate the first highlight with the received user input. The received user input can be the viewer requesting a specific highlight to be include in the profile card of the viewer. Furthermore, the first highlight can be stored in the recently viewed database 115. For example, the first viewer can be a recruiter, and the recruiter is promoting a job posting via the user input. The recruiter may want to inform the first member to apply to a job listing, and pays to promote the job listing. Furthermore, the first highlight can be the job listing from a plurality of job listings that is the most relevant to the first member as determined by the relevance score of the first highlight. Subsequently, when the first member views the profile card of the first viewer, the first member will also view a link to the job listing.

Additionally, in response to a confirmation from the member, the action module 208 can perform the action. Example actions include, but are not limited to, automatically applying to the job listing, sending a connection request to the member, messaging the member through a messaging application, or emailing the member.

In some instances, the method 300 further includes the user interface 202 receiving a user input from the first member selecting the first highlight in the first profile card. An example of a user input can include the member clicking the highlight. Subsequently, the action module 208 can perform an action associated with the first highlight in response to the received user input. Performing the action can include opening a new page associated with the first highlight, such as when the first highlight is a link. The new page can be a company page of the first viewer, a job listing, or a new product page. Additionally, performing the action can include generating email or message on behalf of the first member.

In some instances, the WVMP feature includes a plurality of profile cards that include one or more genetic profile cards (e.g., profile card without a highlight) and one or more enhanced profile cards (e.g., profile card with a highlight). The method 300 can further include the profile selector 204 selecting a second viewer profile from the list of viewer profiles using the member data 220 similar to the techniques described at operation 330. Additionally, the profile card generator 112 can generate a second profile card for the second viewer profile by comparing the profile attributes associated with the second viewer profile. Furthermore, the relevance score calculator 207 can calculate a second relevance score for a second highlight from the at least one highlight associated with the second viewer profile, the second highlight being different than the first highlight. For example, the second highlight can be a profile highlight 126, and the first highlight can be a job highlight 128. Given that the relevance score for each highlight is dependent on the similarity between the viewer profile and the member profile, different highlights can be selected for different viewer profiles when selecting the highlight with the highest relevance score. Moreover, the profile card generator 112 can update the second profile card for the second viewer profile when the second relevance score for the second highlight is higher than a second threshold value, the updated second profile card including the second highlight. The second threshold value can be the same value as the predetermined threshold value from operation 360. Alternatively, the second threshold value can be higher than the predetermined threshold value since one of the profile cards already has a highlight. Subsequently, the user interface 202 further causes a presentation of the second profile card on the display of the device of the first member.

FIG. 4 is a flowchart illustrating a method 400 for calculating a relevance score of a highlight, according to various embodiments. Operations in the method 400 may be performed by the network-based system 105, using modules described above with respect to FIG. 2. As shown in FIG. 4 the method 400 includes operations 410, 420, 430, 440, and 450.

At operation 410, the relevance score calculator 207 receives a highlight associated with a viewer profile. As previously discussed, the profile selector 204 accesses viewer data 230 at operation 310 in method 300. The viewer data 230 includes a list of viewers of first member profile 222, which can be a list of viewer profiles having viewed the profile of the first member. Additionally, each viewer profile is associated with at least one highlight, which is stored in the highlight database 125.

At operation 420, the relevance score calculator 207 determines the type of highlight received at operation 410. For example, the type of highlight received can be determined based on the group (e.g., sales group, recruiter group) associated with the viewer profile. The highlight can be a profile highlight 126, a social graph highlight 127, a job highlight 128, or a promotion highlight 129.

At operation 430, the relevance score calculator 207 selects a relevance factor for the received highlight based on the determined type. In some instances, a predetermined value for the relevance factor is associated with different types of highlights. For example, the relevance factor can have a range from zero to one, and the relevance factor for the promotion highlight can be set at 0.8 while the relevance score for the job highlight can be set to 0.9. For example, a promotion highlight 129 can have a higher relevance factor than the other types, because the viewer may have paid a fee to promote the promotion highlight. Additionally, the relevance factor for the profile highlight 126, the social graph highlight 127, the job highlight 128 can be set at 0.5. Continuing with this example, the machine learning techniques can modify the relevance factor based on the click-rate on the different type of highlights.

The relevance factor can be directly correlated to the click-rate of the first member for each determined type. For example, the relevance factor for the profile highlight 126 increases when the click-rate associated with the profile highlight 126 is higher than the click-rate associated with the social graph highlight 127. The relevance factor can increase by a predetermined amount, or ratio, on a direct correlation basis with the click-rate. In one embodiment, the predetermined amount is a value of one. As previously discussed, the click-rate of the first member can be stored in the activity data 216 of the first member. Furthermore, the relevance score can be updated using the past performance data associated with the highlight, such as the likelihood of the first member clicking a similar highlight or requesting to perform a recommended action. The machine learning algorithms can receive the past performance data associated with the highlight to increase the relevance score when the first member has clicked on a similar highlight, or decrease the relevance score when the first member has not clicked on a similar highlight.

At operation 440, the relevance score calculator 207 calculates an initial score for the received highlight based on the member data 220 of the first viewer and the member data 220 of the member. In some instances, the highlight is linked to specific profile attributes, and the initial score is a summation of the profile attributes 212 of first member that are the same as the specific profile attributes.

For example, the job highlight 128 can be linked to specific profile attributes such as a specific job title, a specific education, a specific location. The specific profile attributes can be derived from the job posting, such as information available in the job description of the job posting. The initial score for this job highlight 128 is calculated by summing the number of profile attributes 212 of the member (e.g., first member) that match to the specific profile attributes. Continuing with the example, the initial score is reduced if the specific location associated with the job listing is different than the location of the member. Similarly, the initial score is increased if the specific job title matches the current job title of the member, or if the specific education is similar to the member's education. As previously described in an example above, a job highlight 128 for a job posting can be associated with a location (i.e., San Francisco), industry (i.e., technology), job title (i.e., software developer). The initial score for this job highlight 128 would be three, if the first member is a software developer that works in a technology company and lives in San Francisco.

When the highlight is a profile highlight 126, the initial score can be further calculated by using information derived from the profile attributes 212 of the member and the viewer. In some instances, the initial score can be a summation of the number of profile attributes that are similar between the viewer profile and the member profile. For example, the initial score would be four if the viewer profile and the member profile have a common employer, a common educational institution, a common degree, and a common skill.

When the highlight is a social graph highlight 127, the initial score can be further calculated using information related to a job opening at an employer of the member, a connection of the member in the social network system 210, or other information obtained from the social graph data 214 of the member and the viewer data. For example, the initial score can be a summation of the number of similar first-degree connections between the viewer and the member.

When the highlight is a promotion highlight 129, the initial score can be further calculated using information related to a content posting in the social network by the viewer, specific profile attributes linked to a product associated with the promotion highlight 129, or the paid fee associated with the promotion highlight 129. In some instances, the initial score can be summation of the number of similar specific profile attributes associated with the promotion highlight 129 and the profile attributes 212 associated with the first member. The specific profile attributes can correspond to attributes that is available in the product description of the product associated with the promotion highlight 129. Alternatively, the initial score can be calculated using a predetermined ratio on a direct correlation basis with the paid fee.

At operation 450, the relevance score calculator 207 multiplies the initial score by the relevance factor to determine the relevance score. As previously discussed, the relevance score is used at operation 360 to determine whether to update the profile card to include the highlight. Continuing with the example above, the initial score for the job highlight is calculated to be 4 at operation 440, and the relevance factor for this type of highlight is selected to be 0.9 at operation 430, then the relevance score is determined to be 3.6 at operation 450.

FIG. 5 is an example of a WVMP feature 500 in a social network system 210, according to various embodiments.

The WVMP feature 500 includes a first profile card 510, a second profile card 530, and a third profile card 540. The first profile card 510 is enhanced with a highlight 520. The second profile card 530 and the third profile card 540 are generic (e.g., non-enhanced) profile cards. The highlight 520 included in the first profile card 510 is personalized for the member using the techniques described herein. The highlight 520 in this example is a promotion highlight 129 that is promoting a specific product. Additionally, the highlight 520 includes a link 550 associated with the highlight 520. The member can select the link 550, and the action module 208 can perform an action associated with the link 550.

EXAMPLE MACHINE ARCHITECTURE AND MACHINE-READABLE MEDIUM

Figure 6:
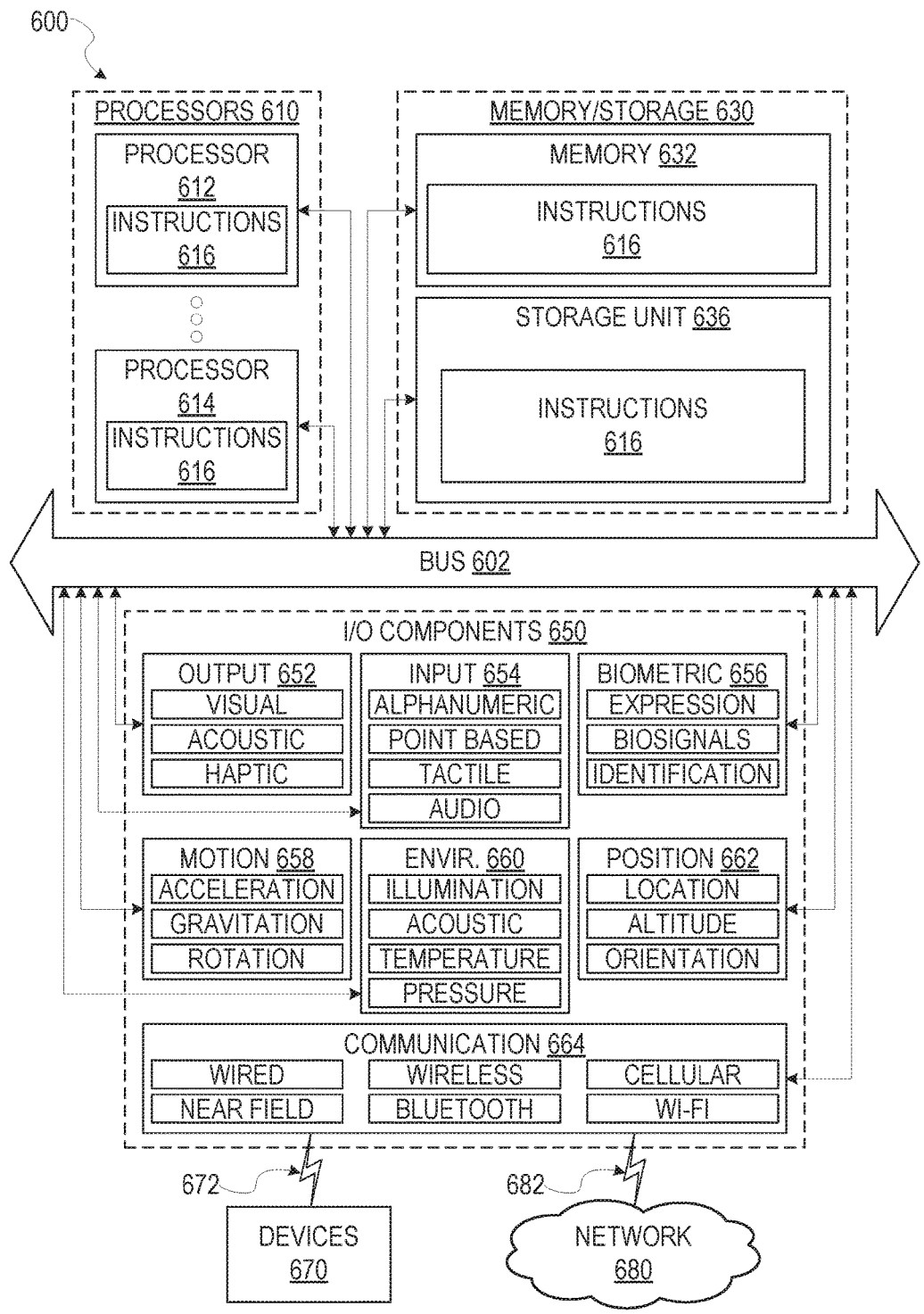
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 (including, e.g., user interface 202, profile selector 204, profile card generator 112, relevance score calculator 207, action module 208 of FIG. 2) to execute the flow diagrams of FIGS. 3 and 4. The instructions 616 transform the general, non-programmed machine 600 into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine 110 or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor 610, or any suitable combination thereof) may include, for example, a processor 612 and a processor 614 that may execute the instructions 616. The term "processor" is intended to include multi-core processors 610 that may comprise two or more independent processors 612, 614 (sometimes referred to as "cores") that may execute the instructions 616 contemporaneously. Although FIG. 6 shows multiple processors 610, the machine 600 may include a single processor 612 with a single core, a single processor 612 with multiple cores (e.g., a multi-core processor), multiple processors 612, 614 with a single core, multiple processors 612, 614 with multiples cores, or any combination thereof. For example, the operations described in method 300 and method 400 can be performed by one or more of the processors 610.

The memory/storage 630 may include a memory 632, such as a main memory or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readably: medium" means a device 130, 150 able to store the instructions 616 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device 130, 150, as well as "cloud-based" storage systems or storage networks that include multiple storage apparatus or devices 130, 150. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine 600 will depend on the type of machine 600. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672 respectively. For example, the communication components 664 may include a network interface component or other suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)). For example, network 190 can be similar to the network 680, and the profile selector 204 performing method 300 (e.g., operation 310) can include the communication components 664 to interface with network 680. Additionally, the profile selector 204 can access the member database 120 via the network 680 using communication components 664, as described at operation 320 in FIG. 3.

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LIE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Unless specifically stated otherwise, the terms "a" or "an" are herein used, as is common in patent documents, to include one or more than one instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 610 or a group of processors 610) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 610 or other programmable processor 610. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 610 configured by software to become a special-purpose processor, the general-purpose processor 610 may be configured as respectively different special-purpose processors (e.g., comprising different hardware modules) at different times. Software (e.g., a software module) may accordingly configure one or more processors 610, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 610 that are temporarily configured (e.g., by software) or permanently configured to perform the relevant operations. Whether temporarily or permanently configured, such processors 610 may constitute processor-implemented modules that operate to perform one or more operations or functions described herein. As used herein, "processor-implemented module" refers to a hardware module implemented using one or more processors 610.

Similarly, the methods described herein may be at least partially processor-implemented, a processor 610 being an example of hardware. For example, at least some of the operations of a method may be performed by one or more processors 610 or processor-implemented modules. As used herein, "processor-implemented module" refers to a hardware module in which the hardware includes one or more processors 610. Moreover, the one or more processors 610 may also operate to support performance of the relevant operations in a "cloud computing" environment or as a "software as a service" (SaaS). For example, at least some of the operations may be performed by a group of computers (as examples of machines 600 including processors 610), with these operations being accessible via a network 680 (e.g., the Internet) and via one or more appropriate interfaces (e.g., an application programming interface (API)).

The performance of certain operations may be distributed among the one or more processors 610, not only residing within a single machine 600, but deployed across a number of machines 600. In some example embodiments, the one or more processors 610 or processor-implemented modules may be located in a single geographic location (e.g., within a home environment, an office environment, or a server farm). In other example embodiments, the one or more processors 610 or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 600. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 600 (e.g., a computer) that manipulates or transforms data represented as physical (e.g., electronic, magnetic, or optical) quantities within one or more memories 632 (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   a recently viewed database storing viewer data, the viewer data including a list of viewer profiles having viewed a first member profile of a first member, each viewer profile in the list of viewer profiles being associated with at least one highlight;
   a member database storing member data of the first member profile and member data of the list of viewer profiles, the member data having profile attributes associated with each profile, wherein one or more of the profile attributes are listed in a profile page associated with each profile;
   one or more processors and a memory to store instructions, the instructions executed by the one or more processors to:
   select a first viewer profile from the list of viewer profiles based on the member data;
       generate a profile card for the selected first viewer profile based on the profile attributes associated with the selected first viewer profile, the profile card having less profile attributes than the profile page associated with the first viewer profile;
       calculate a relevance score for a first highlight from the at least one highlight associated with the selected first viewer profile, the relevance score being calculated based on the member data of the first member profile; and
       update the generated profile card for the selected first viewer profile based on the calculated relevance score for the first highlight being higher than a predetermined threshold value, the updated profile card including the first highlight; and
       a user interface causing a presentation of the profile card on a display of a device of the first member.

2. The system of claim 1, wherein the first viewer profile is selected from the list of viewer profiles based on a number of profile attributes being similar between the first viewer profile and the first member profile.

3. The system of claim 1, wherein the member data further includes social graph data having first-degree connections for each profile, and wherein the first viewer profile is selected from the list of viewer profiles based on a number of first-degree connections being similar between the first viewer profile and the first member profile.

4. The system of claim 1, wherein each viewer profile in the list of viewer profiles includes a public viewing mode or a private viewing mode, and wherein the first viewer profile is selected from the list of viewer profiles based on the first viewer profile having the public viewing mode.

5. The system of claim 1, wherein the generated profile card includes fewer than five profile attributes, and wherein the first viewer profile includes more than ten attributes.

6. The system of claim 1, wherein the one or more processors are further configured to:
   receive an indication that a new viewer profile has viewed the first member profile; and
   update the list of viewer profiles to include the new viewer profile.

7. The system of claim 1, wherein the one or more processors are further configured to:
   determine that a second viewer profile has not viewed the first member profile in a predetermined amount of time; and
   update the list of viewer profiles to remove the second viewer profile.

8. The system of claim 1, wherein the one or more processors are further configured to:
   receive a user input from the first viewer profile;
   generate the first highlight based on the received user input; and
   store the first highlight in the recently viewed database.

9. The system of claim 1, wherein the relevance score for the first highlight is calculated based on a number of profile attributes of the first member profile being similar to specific profile attributes obtained from the first highlight.

10. The system of claim 1, wherein the relevance score is further calculated based on a click rate associated with the first highlight.

11. The system of claim 1, wherein the relevance score for the first highlight is further calculated based on a paid fee associated with the first highlight.

12. The system of claim 1, wherein the one or more processors are further configured to:
   select a second viewer profile from the list of viewer profiles based on the member data;
   generate a second profile card for the second viewer profile based on profile attributes associated with the second viewer profile;
   calculate a second relevance score for a second highlight from at least one highlight associated with the second viewer profile, the second highlight being different than the first highlight;
   update the second profile card for the second viewer profile based on the second relevance score for the second highlight being higher than the predetermined threshold value, the updated second profile card including the second highlight; and
   the user interface further causing a presentation of the second profile card on the display of the device of the first member.

13. The system of claim 1, wherein the user interface receives a user input selecting the first highlight in the first profile card; and
   wherein the one or more processors are further configured to perform an action associated with the first highlight based on the received user input.

14. The system of claim 1, wherein the at least one highlight including a profile highlight, a social graph highlight, a job highlight or a promotion highlight.

15. The system of claim 1, wherein the at least one highlight includes a hyperlink.

16. The system of claim 1, wherein the at least one highlight includes a job posting associated with an employer of a viewer profile.

17. The system of claim 1, wherein the first highlight is a product associated with a viewer profile.

18. A method comprising:
   accessing, by one or more computer processors, viewer data from a recently viewed database, the viewer data including a list of viewer profiles having viewed a first member profile of a first member, each viewer profile in the list of viewer profiles being associated with at least one highlight;
   accessing, from a member database, member data of the first member profile and member data of the list of viewer profiles, the member data having profile attributes associated with each profile, wherein one or more of the profile attributes are listed in a profile page associated with each profile;

selecting, using the one or more computer processors, a first viewer profile from the list of viewer profiles based on the member data;

generating a profile card for the selected first viewer profile based on the profile attributes associated with the selected first viewer profile, the profile card having less profile attributes than the profile page associated with the first viewer profile;

calculating a relevance score for a first highlight from the at least one highlight associated with the selected first viewer profile, the relevance score being calculated based on the member data of the first member profile;

updating the generated profile card for the selected first viewer profile based on when the calculated relevance score for the first highlight being higher than a predetermined threshold value, the updated profile card including the first highlight; and causing a presentation of the profile card on a display of a device of the first member.

19. The method of claim 18, further comprising:

selecting a second viewer profile from the list of viewer profiles based on the member data;

generating a second profile card for the second viewer profile based on profile attributes associated with the second viewer profile;

calculating a second relevance score for a second highlight from at least one highlight associated with the second viewer profile, the second highlight being different than the first highlight; and updating the second profile card for the second viewer profile based on the second relevance score for the second highlight being higher than the predetermined threshold value, the updated second profile card including the second highlight; and causing a presentation of the second profile card on the display of the device of the first member.

20. A non-transitory machine-readable storage medium comprising instructions that, when executed by one or more processors of a machine, cause the machine to perform operations comprising:

storing viewer data in a recently viewed database, the viewer data including a list of viewer profiles having viewed a first member profile of a first member, each viewer profile in the list of viewer profiles being associated with at least one highlight;

storing, in a member database, member data of the first member profile and member data of the list of viewer profiles, the member data having profile attributes associated with each profile, wherein one or more of the profile attributes are listed in a profile page associated with each profile;

selecting a first viewer profile from the list of viewer profiles based on the member data;

generating a profile card for the selected first viewer profile based on the profile attributes associated with the selected first viewer profile, the profile card having less profile attributes than the profile page associated with the first viewer profile;

calculating a relevance score for a first highlight from the at least one highlight associated with the selected first viewer profile, the relevance score being calculated based on the member data of the first member profile;

updating the generated profile card for the selected first viewer profile based on the calculated relevance score for the first highlight being higher than a predetermined threshold value, the updated profile card including the first highlight; and causing a presentation of the profile card on a display of a device of the first member.

* * * * *